No. 839,310. PATENTED DEC. 25, 1906.
H. R. NELSON.
WEEDER TOOTH.
APPLICATION FILED JULY 25, 1906.

WITNESSES

INVENTOR
HENRY R. NELSON
BY
HIS ATTORNEYS

UNITED STATES PATENT OFFICE.

HENRY R. NELSON, OF WALNUT GROVE, MINNESOTA.

WEEDER-TOOTH.

No. 839,310.           Specification of Letters Patent.           Patented Dec. 25, 1906.

Application filed July 25, 1906. Serial No. 327,725.

*To all whom it may concern:*

Be it known that I, HENRY R. NELSON, of Walnut Grove, Redwood county, Minnesota, have invented certain new and useful Improvements in Weeder-Teeth, of which the following is a specification.

The object of my invention is to provide a weeder-tooth of peculiar shape which will loosen the soil and tear out the weeds without breaking or injuring the plants.

My invention consists generally in a tooth substantially as hereinafter described, and particularly pointed out in the claims.

Figure 1:
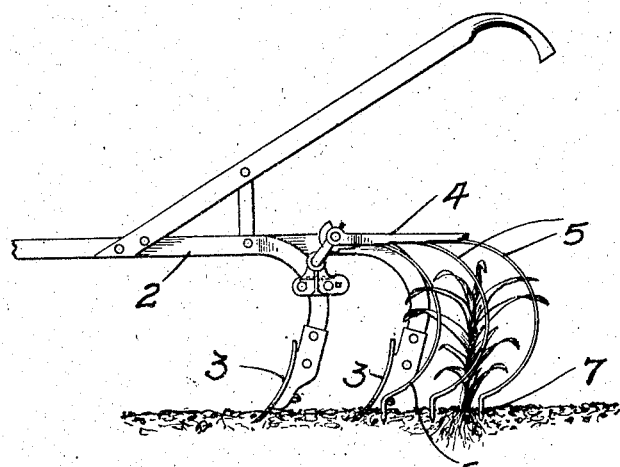
Figure 2:
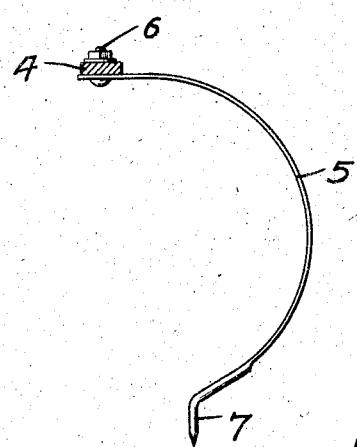
Figure 3:
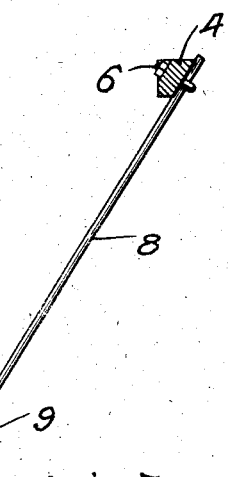
Figure 4:
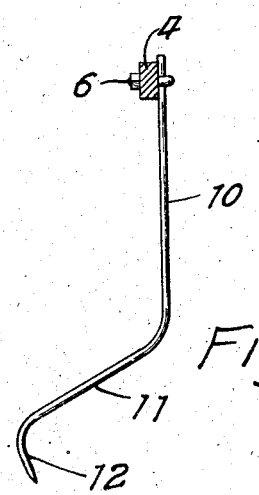

In the accompanying drawings, forming part of this specification, Figure 1 is a side elevation of a cultivator, showing my improved weeder-teeth connected thereto. Fig. 2 is a detail view showing a form of tooth employed. Fig. 3 is a similar view illustrating the modification in the shape of the tooth. Fig. 4 illustrates still another modification.

In the drawings, 2 represents a cultivator having the usual plows 3, and 4 is a weeder-frame attached to one of the drag-bars of the cultivator and forming the subject-matter of United States application for Letters Patent, Serial No. 295,020, filed by me January 8, 1906. In a device of this kind it is desirable to provide some means for preventing the cornstalks from being injured or broken off entirely when the teeth of the weeding attachment pass over the hill. I therefore provide the frame 4 with a series of teeth 5, secured by bolts 6 at their upper ends and curved backwardly and downwardly from that point in a semicircular form and having a point or lower end 7, which is turned downwardly at an obtuse angle and in a vertical position with respect to the soil. This point is only a few inches long, and at its upper end the tooth curves backwardly, and consequently when it is passing through or over the hill the point or lower portion of the tooth will be digging into the soil, while the upper portion will be a considerable distance in the rear of the point and will not contact sufficiently with the cornstalks to injure or break them.

I have found that where an ordinary tooth is used that while the point or lower portion is loosening the soil and tearing out the weeds that the upper portion will bear on the leaves and stalks of the corn and frequently will bend and break them. I have also found that it is impracticable to employ a tooth that is backwardly and downwardly curved and approaches the soil at an acute angle and has a skimming or scraping effect thereon, as such a tooth will dig into the soil and sometimes tear the corn-plants out by the roots. By turning the point of the tooth downwardly, however, so that it stands in a vertical position with respect to the soil, I have found that it has a dragging action and will loosen the dirt and pull out the weeds without in any way injuring the plants. The tooth may be made in various ways to produce substantially the same result.

In Fig. 3 I have shown a modified construction which consists in providing a tooth having a forwardly-inclined portion 8 and a vertical point 9, and in Fig. 4 I have shown a tooth having a straight upper portion 10, a forwardly-inclined lower portion 11, and a backwardly-turned point 12. The forwardly-inclined part 11 will prevent the corn-plant from being injured by the tooth, and the downwardly and backwardly turned point will loosen up the soil and break the clods and destroy the weeds without tearing the corn-plants out by the roots or otherwise injuring them.

Various forms of teeth may be provided, the essential feature of them being the vertical or backwardly-inclined point, which will loosen the soil without destroying or breaking down the plants. This form of tooth, besides being particularly adapted for a cultivator weeding attachment, is also capable of use on a harrow or any approved style of weeder.

I claim as my invention—

1. A cultivator-tooth having a forwardly-projecting shank terminating in a backwardly-turned end which forms an obtuse angle with the contiguous portion of the tooth and stands in a vertical position substantially with respect to the soil.

2. A weeding attachment for cultivators having a series of spring-teeth each tooth having a forwardly-projecting shank and a backwardly-turned point whereby the teeth will drag through the hill and pull up the weeds without breaking or injuring the stalks of the plant.

In witness whereof I have hereunto set my hand this 19th day of July, 1906.

HENRY R. NELSON.

Witnesses:
    GEO. D. ANNE,
    H. O. GARLOCK.